Patented Sept. 1, 1931

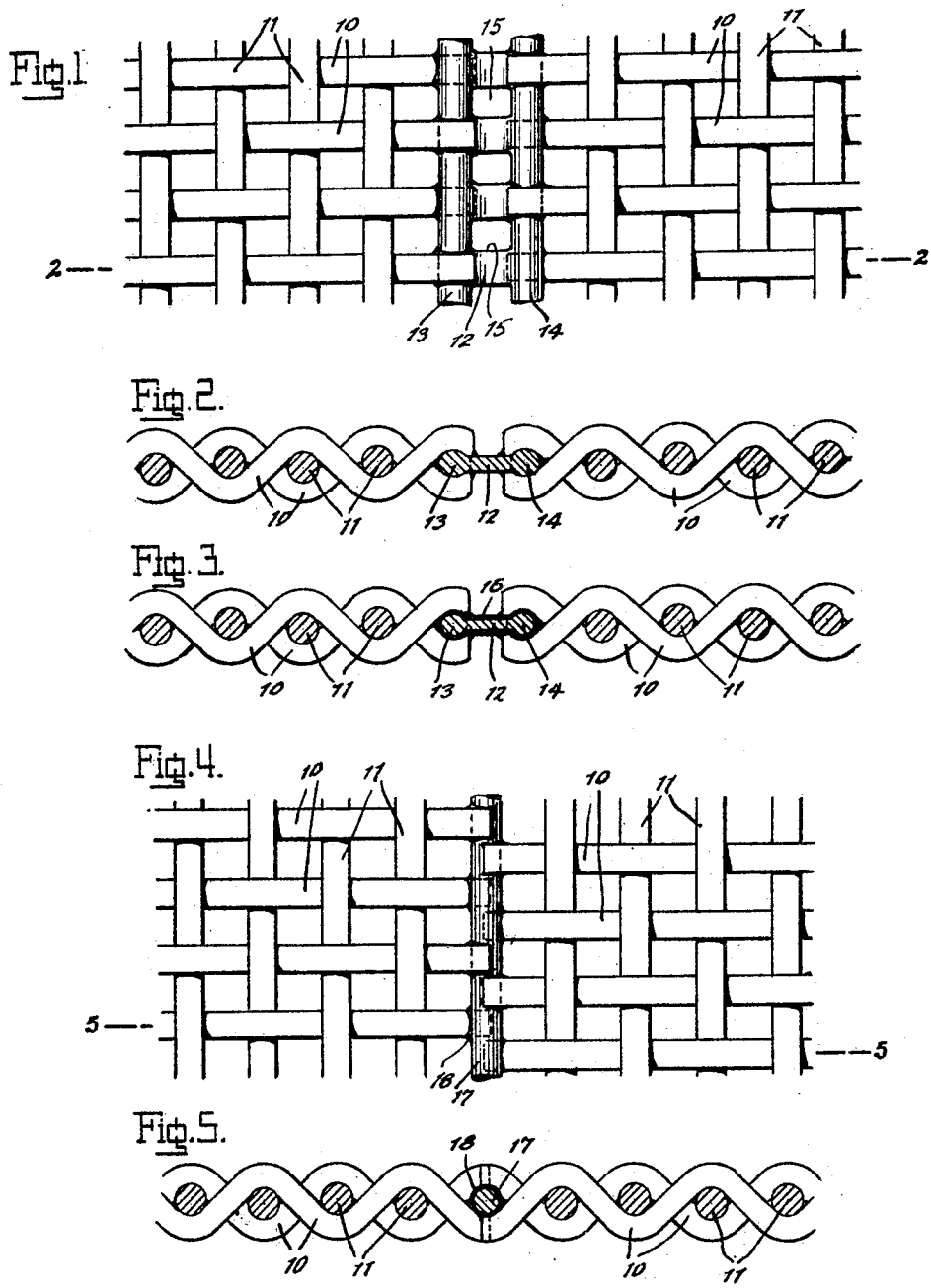

1,821,456

UNITED STATES PATENT OFFICE

NELSON W. WEBB, OF BELLEVILLE, NEW JERSEY, ASSIGNOR TO EASTWOOD WIRE CORPORATION, OF BELLEVILLE, NEW JERSEY, A CORPORATION OF NEW JERSEY

WOVEN-WIRE BELT FOR PAPER-MAKING MACHINES

Application filed December 12, 1929. Serial No. 413,576.

The present invention relates to woven wire belts, particularly for paper-making machines of the Fourdrinier type, and has for an object to provide an improved seam or jointure between the ends of the length of wire mesh, and whereby a substantially endless belt is produced. It is particularly proposed to secured the ends by welding, brazing or soldering in such manner that the joint will have substantially the same characteristics of porosity, flexibility and strength as the body of the wire mesh.

A further object is to provide a seam structure, whereby the joining of the ends may be carried out in a convenient, uniform and economical manner, and to this end it is proposed to remove the end weft wires from the length of wire mesh and provide a single connecting element engaged between the opposed warp wire ends and connected thereto by brazing, welding or soldering. A further object is to provide a connecting element having openings therein, corresponding to the openings of the wire mesh, and whereby the seam will have substantially the same porosity and drainage characteristics as the body of the wire mesh.

With the above and other objects in view, embodiments of the invention are shown in the accompanying drawings, and these embodiments will be hereinafter more fully described with reference thereto and the invention will be finally pointed out in the claims.

In the drawings:

Fig. 1 is a plan view of a portion of a woven wire belt at the seam;

Fig. 2 is a longitudinal sectional view taken along the line 2—2 of Fig. 1;

Fig. 3 is a similar view of a modified form of the invention;

Fig. 4 is a plan view of a portion of a woven wire belt, according to a further modified form of the invention; and Fig. 5 is a longitudinal sectional view taken along the line 5—5 of Fig. 4.

Similar reference characters indicate corresponding parts throughout the several figures of the drawings.

Referring particularly to Figs. 1 and 2 of the drawings there is shown, greatly enlarged, a portion of the two ends of the wire cloth which are seamed together to form a belt, the portion, as shown, representing a piece of the belt which in its actual size is about $\frac{1}{16}$ of an inch in width. The wire cloth consists of warp wires 10 and weft wires 11 of brass, bronze, or other suitable material for the purpose. The end weft wire at each end is removed and the warp ends cut so that they present a slight opening.

A connecting element in the form of a metal strip 12, having slightly enlarged longitudinal edge portions 13 and 14, is engaged at its edge portions in the openings between the warp wire ends, and thereupon the strip is secured to the warp wire ends by brazing, welding, or soldering. The spacing of the enlarged edges of the strip corresponds to the spacing of the weft wires of the wire mesh, and the portion between said enlarged edges is perforated as at 15 in substantial correspondence to the mesh openings, so that the seam structure will have substantially the same drainage characteristics as the body of the wire mesh.

In Fig. 3 I have shown a modification in which the strip 12 is provided with a solder coat 16, which upon the application of heat will produce solder joints at the points of intersection with the warp wire ends, this method resulting in a strong, uniform union along the entire width of the belt, the uniform flow of the solder coat preventing lumpy spots and filling of the mesh and strip openings.

In Figs. 4 and 5 I have illustrated a further modified form in which a connecting wire 17, corresponding in diameter to the weft wires, is provided between the opposed warp wire ends, in substitution of the two weft wires removed from the ends of the length of wire cloth. The warp wire ends are preferably staggered, as shown, so that any irregularity in the cutting of the ends will not affect the alinement of the seam. The wire 17 is connected to the warp wire ends by brazing, welding, or soldering, and for this purpose is preferably provided with a solder coat 18, which upon the application of heat produces solder joints at the points of intersection with the warp wire ends.

I have illustrated and described preferred and satisfactory embodiments of the invention, but it will be obvious that changes may be made therein, within the spirit and scope thereof as defined in the appended claims.

Having thus described my invention what I claim and desire to secure by Letters Patent is:—

1. In a wire cloth belt, a length of woven wire cloth comprising warp and weft wires, the warp wire ends at each end having a space formed by the removal of a weft wire, a solder covered connecting element having portions disposed in said respective end spaces of the warp wire ends, and connected thereto by heat-produced solder joints formed from said solder covering.

2. In a wire cloth belt, a length of woven wire cloth comprising warp and weft wires, the warp wire ends at each end having a space formed by the removal of a weft wire, a connecting element having portions disposed in said respective end spaces of the warp wire ends, and connected thereto by a heat-produced metallic union, and a perforated portion between said first mentioned portions.

3. In a wire cloth belt, a length of woven wire cloth comprising warp and weft wires, the warp wire ends at each end having a space formed by the removal of a weft wire, a connecting element having enlarged edge portions disposed in said respective end spaces of the warp wire ends, and connected thereto by a heat-produced metallic union.

4. In a wire cloth belt, a length of woven wire cloth comprising warp and weft wires, the warp wire ends at each end having a space formed by the removal of a weft wire, a connecting element having enlarged edge portions disposed in said respective end spaces of the warp wire ends, and connected thereto by a heat-produced metallic union, and a perforated portion between said enlarged edge portions.

Signed at Belleville, county of Essex, and State of New Jersey, this 14 day of November, 1929.

NELSON W. WEBB.